United States Patent [19]

Okada et al.

[11] Patent Number: 4,603,174

[45] Date of Patent: Jul. 29, 1986

[54] STRETCHED POLYPROPYLENE FILM

[75] Inventors: Tadayuki Okada; Masahiro Kakugo; Yoshiharu Fukui; Kizuku Wakatsuki; Seiichiro Ima; Junichi Kimura, all of Chiba, Japan

[73] Assignee: Sumitomo Chemical Company, Limited, Osaka, Japan

[21] Appl. No.: 686,865

[22] Filed: Dec. 27, 1984

[30] Foreign Application Priority Data

Dec. 27, 1983 [JP] Japan ................................. 58-248521

[51] Int. Cl.$^4$ .............................................. C08L 23/04
[52] U.S. Cl. .................................... 525/240; 264/291; 428/516; 428/910; 524/274; 526/308; 526/282; 526/274
[58] Field of Search ...................... 428/910, 516, 348.1; 526/308, 282; 524/274; 525/240; 264/291

[56] References Cited

U.S. PATENT DOCUMENTS

| | | | |
|---|---|---|---|
| 3,773,609 | 11/1973 | Haruta et al. | 428/516 |
| 4,166,057 | 8/1979 | Takemori | 525/240 |
| 4,405,772 | 9/1983 | Wong et al. | 526/308 |

*Primary Examiner*—Edith Buffalow
*Attorney, Agent, or Firm*—Sughrue, Mion, Zinn, Macpeak and Seas

[57] ABSTRACT

A stretched polypropylene film having excellent see-through characteristics, which is prepared by stretching in at least one direction a polypropylene resin sheet containing 0.05 ppm to 10,000 ppm by weight of a 3-position branched α-olefin unit and/or a vinyl cycloalkane unit, each having at least 6 carbon atoms.

5 Claims, No Drawings

STRETCHED POLYPROPYLENE FILM

FIELD OF THE INVENTION

This invention relates to a stretched polypropylene film having excellent see-through characteristics.

BACKGROUND OF THE INVENTION

Stretched polypropylene films, especially biaxially stretched ones, have found extensive use as food packaging, and fiber packaging and in other applications because of their good optical properties such as transparency and gloss, mechanical properties such tensile strength and rigidity and moisture proofness. In some applications, however, these properties are not fully satisfied. In particular, in applications which require see-through characteristics, the optical non-uniformity inherent to stretched polypropylene films is a problem and greatly limits the range of their utility.

Various attempts have therefore been made to improve the optical properties of stretched polypropylene films. For example, Japanese Patent Publication Nos. 1279/1971 and 15779/1979 show that biaxially stretched films of polypropylene containing specified alicyclic hydrocarbon resins or terpene resins have improved optical properties, especially in transparency and gloss. However, the improvement of the optical properties of the biaxially stretched films obtained by the methods disclosed in these patent documents is insufficient. It is also known that since these films contain fairly large amounts of additives such as the alicyclic hydrocarbon resins, the inherent solvent resistance of polypropylene is reduced, or fuming and roll contamination occurs remarkably during film formation.

SUMMARY OF THE INVENTION

In view of the foregoing state of art, the present inventors have made various investigations, and have found that a stretched film having excellent see-through characteristics can be obtained without degrading the inherent properties or film-forming property of a polypropylene resin by forming a film from a melt of the polypropylene resin containing a specific α-olefin and/or vinyl cycloalkane, and then stretching the film. This discovery has led to the present invention.

According to this invention, there is provided a stretched polypropylene film having excellent see-through characteristics, prepared by stretching in at least one direction a polypropylene resin sheet containing 0.05 ppm to 10,000 ppm by weight of a 3-position branched α-olefin unit and/or a vinyl cycloalkane unit, each having at least 6 carbon atoms.

DETAILED DESCRIPTION OF THE INVENTION

The amount of the 3-position branched α-olefin unit and/or the vinyl cycloalkane unit, each having at least 6 carbon atoms, is not particularly limited. But to avoid changes in the inherent properties of the polypropylene resin, it is preferably as small as possible. Accordingly, the suitable amount of the α-olefin unit and/or the vinyl cycloalkane unit is 0.05 ppm to 10,000 ppm by weight, preferably 0.5 ppm to 5,000 ppm by weight, more preferably 0.5 ppm to 1,000 ppm by weight.

Examples of the 3-position branched α-olefin or the vinyl cycloalkane used in this invention include 3,3-dimethylbutene-1, 3-methylpentene-1, 3-methylhexene-1,3,5,5-trimethylhexene-1, vinyl cyclopentane, vinyl cyclohexane and vinyl norbornane, with 3-methylpentene-1, vinyl cyclopentane and vinyl cyclohexane being preferred.

Polypropylene resins containing the 3-position branched α-olefin or the vinyl cycloalkane used in this invention may be produced, for example, by the following methods.

(1) The 3-position branched α-olefin or the vinyl cycloalkane is polymerized in the presence of a Ziegler-Natta catalyst, and subsequently propylene is polymerized alone or with another α-olefin.

(2) The polymer obtained in (1) above is mixed with a propylene homopolymer or a copolymer of propylene with another α-olefin.

(3) A polymer of the 3-position branched α-olefin or the vinyl cycloalkane is mixed with a propylene homopolymer or a copolymer of propylene with another α-olefin.

The homopolymerization or copolymerization of the 3-position branched α-olefin or the vinyl cycloalkane may be carried out preferably in the presence of a polymerization solvent. Suitable polymerization solvents include the above vinyl cycloalkane monomers themselves and hydrocarbons such as butane, hexane, heptane, benzene and toluene. The polymerization temperature is 20° C. to 100° C., and the polymerization pressure is atmospheric pressure to 60 kg/cm$^2$-G.

Examples of another α-olefin to be copolymerized with propylene are those having 2 to 18 carbon atoms include ethylene, butene-1, pentene-1, hexene-1, and octene-1. An amount of another α-olefin which is copolymerized with propylene is up to 50 mole% per mole of propylene.

Further, the homopolymerization of propylene or the copolymerization of it with another α-olefin may be carried out by known polymerization methods, for example, by slurry polymerization in a hydrocarbon solvent such as hexane or heptane, bulk polymerization in liquefied propylene, vapor-phase polymerization in a propylene gas, etc. The copolymerization of propylene with another α-olefin may be random copolymerization or block copolymerization. The polymerization temperature is 20° C. to 100° C., and the polymerization pressure is atmospheric pressure to 60 kg/cm$^2$-G.

The propylene polymers used in (2) or (3) may have a known polymer or filler, such as EP (ethylene/propylene) rubber, talc, or silica, blended therewith. Mixing in (2) or (3) may be effected by a general method using a roll, an extruder, etc.

Various additives to be generally incorporated in the polypropylene resin, such as antioxidants, lubricants, anti-static agents and antiblocking agents, may be properly added.

The stretched film of this invention may be obtained by stretching methods usually employed industrially, for example, by roll stretching, tenter stretching and tubular stretching, in at least one direction. A suitable stretch ratio is 1.2 to 100 times in terms of area stretch ratio.

Needless to say, a stretched film having excellent see-through characteristics without optical nonuniformity can be obtained by stretching the polypropylene resin sheet used in this invention. It has also been ascertained that as an incidental effect, the polypropylene resin sheet has better stretchability than conventional polypropylene resins. Specifically, the present inventors observed the reduction of the stretching stress and the decrease of the film breakage phenomenon during stretching.

The following examples illustrate the present invention more specifically. It should be understood however that the invention is in no way limited to these examples. In these examples the $[\eta]$, melt index, light scattering index (LSI) and haze were measured in accordance with the following methods.

(1) $[\eta]$:

Measured at 135° C. in tetralin by means of an Ubbelohde's viscometer.

(2) Melt index:

Measured in accordance with JIS K-6758.

(3) Light scattering index (LSI):

Measured by means of an LSI tester made by Toyo Seiki K.K. (receiving scattering transmitted light of 1.2° to 3.6°). The LSI value was used as a measure of see-through characteristics because it well corresponded to the see-through characteristics observed with the naked eye.

(4) Haze:

Measured in accordance with ASTM D1003.

EXAMPLE 1

To 100 ml of dehydrated and purified n-heptane were successively added 1.95 g of triethyl aluminum, 675 mg of ethyl p-anisate and 6.0 g of a titanium-containing solid catalyst synthesized in accordance with Example 1 of Japanese Laid-Open Patent Publication No. 59916/1982. The mixed solution was then heated to 50° C. Subsequently, 50 ml of vinyl cyclohexane was added, and polymerized for 15 minutes.

The resulting polymer slurry was washed four times with 200 ml of n-heptane to remove the unreacted vinyl cyclohexane, triethyl aluminum and ethyl p-anisate. From the active slurry washed with n-heptane, n-heptane was removed by distillation under reduced pressure. Thus, 7.8 g of a powder of polyvinyl cyclohexane containing the active catalyst was obtained. The content of polyvinyl cyclohexane per gram of the charged solid catalyst was 0.30 g.

Using 1.06 g of the polymerization catalyst containing the above polyvinyl cyclohexane, 0.75 g of triethyl aluminum, 0.237 g of methyl p-toluate and 1500 ml of n-heptane, propylene was polymerized in a 5-liter stainless steel autoclave at a temperature of 70° C. under a pressure of 6 kg/cm$^2$-G for 40 minutes using hydrogen in a concentration of 1.5% by volume.

After the polymerization, 50 ml of n-butanol was added to stop the polymerization. The polymer slurry was taken out and filtered to separate the polymer powder from the solvent. The polymer powder was washed with 500 ml of 1N hydrochloric acid, and then with methanol until the washings became neutral. The powder was dried and weighed. Its amount was found to be 840 g.

The amount of propylene polymerized was 1030 g per gram of the titanium-containing solid catalyst. The copolymer had an $[\eta]$ of 1.93 dl/g.

The resulting copolymer (0.5 part by weight) and, as stabilizers, 0.1 part by weight of calcium stearate and 0.2 part by weight of BHT (2,6-di-tertiary butyl hydroxytoluene), and 0.05 part by weight of Irganox ®1010 (an antioxidant made by Ciba-Geigy AG; tetrakis[methylene-3(3',5'-di-t-butyl-4-hydroxyphenyl)-propionate]methane) were added to a propylene homopolymer having a melt index of 2.0. They were mixed by a Henscel mixer, and then pelletized in an extruder having a screw diameter of 65 mm.

The resulting pellets were melt-extruded at a resin temperature of 280° C. by a sheet extruder having a screw diameter of 65 mm, and cooled and solidified by a cold roll at 30° C., to obtain a cooled sheet having a thickness of 0.8 mm.

The sheet was stretched by a tenter-type consecutive biaxial stretching device to 4 times in the machine direction (MD) at 145° C. and subsequently to 10 times in the transverse direction (TD) at 160° C., and then heat-treated at 145° C. to obtain a biaxially stretched film having a thickness of about 20 microns.

COMPARATIVE EXAMPLE 1

Without using the vinyl cyclohexane polymer used in Example 1, the propylene homopolymer having a melt index of 2.0 was mixed with as the stabilizers 0.1 part by weight of calcium stearate and 0.2 part by weight of BHT and, as the antioxidant, 0.05 part by weight of Irganox ®1010 as in Example 1. The mixture was pelletized, formed into a sheet and biaxially stretched under the same conditions as in Example 1 to form a biaxially stretched film having a thickness of about 20 microns.

The properties of the films and the stretchability of the polymer sheets in Example 1 and Comparative Example 1 are shown in Table 1.

EXAMPLES 2 AND 3

A biaxially stretched film having a thickness of about 20 microns was prepared under the same conditions as in Example 1 except that the amount of the vinyl cyclohexane copolymer obtained in Example 1 was changed to 1 part by weight (Example 2) or 2 parts by weight (Example 3). In Example 2, the resulting film had an LSI of 2.9% and a haze of 0.5%, and the film obtained in Example 3 had an LSI of 3.0% and a haze of 0.4%.

EXAMPLE 4

The vinyl cyclohexane copolymer (0.5 part by weight) obtained in Example 1 and, as stabilizers, 0.1 part by weight of calcium stearate and 0.1 part by weight of BHT and, as the antioxidant, 0.1 part by weight of Irganox ®1010 were mixed with a propylene-/ethylene copolymer (melt index: 4.0, ethylene content; 3.2% by weight). The mixture was pelletized in the same way as in Example 1. The pellets were melt-extruded at a resin temperature of 250° C. by a sheet extruder having a screw diameter of 65 mm, and cooled and solidified by a cold roll at 30° C. to obtain a cooled sheet having a thickness of 0.5 mm.

The sheet was then stretched by a portable biaxial stretching device simultaneously in two directions at an area stretch ratio of 25 and a stretching temperature of 130° C. to obtain a biaxially stretched film having a thickness of about 20 microns.

COMPARATIVE EXAMPLE 2

The polyvinyl cyclohexane copolymer obtained in Example 1 was not used, and a biaxially stretched film having a thickness of about 20 microns was prepared by the same formulation and under the same processing conditions as in Example 4.

The properties of the films and the stretchability of the sheets in Example 4 and Comparative Example 2 are shown in Table 2.

EXAMPLE 5

To 20 ml of dehydrated and purified n-heptane were added successively 0.6 millimole of diethyl aluminum chloride and 1.10 g of a titanium trichloride catalyst (a product of Marubeni-Solvay Co., Ltd.). The mixed solution was heated to 60° C. Then, 10 ml of vinyl cyclohexane was added, and polymerized for 15 minutes.

There was obtained a catalyst containing vinyl cyclohexane polymerized in an amount of 1.26 g per gram of the titanium trichloride catalyst. Using this catalyst and diethyl aluminum chloride, propylene was polymerized in the same way as in Example 1 to give polypropylene containing 0.14% by weight of vinyl cyclohexane.

The resulting copolymer (0.5 part by weight) and, as stabilizers, 0.1 part by weight of calcium stearate and 0.2 part by weight of BHT and, as the antioxidant, 0.05 part by weight of Irganox ®1010 were mixed with a propylene homopolymer having a melt index of 2.0 as in Example 1. The mixture was pelletized, formed into a sheet and biaxially stretched under the same conditions as in Example 1 to give a biaxially stretched film having a thickness of about 20 microns. The resulting film had a haze of 0.5% and an LSI of 3.0%.

TABLE 1

| | Properties of Film(*1) | | | | Stretchability(*2) | | | |
|---|---|---|---|---|---|---|---|---|
| | | | Young's Modulus (kg/mm$^2$) | | Tenter Stretching Speed (m/min.) | | | |
| | Haze (%) | LSI (%) | MD | TD | 12 | 16 | 20 | 24 |
| Example 1 | 0.4 | 3.2 | 220 | 475 | o | o | o | Δ |
| Comparative Example 1 | 0.4 | 13.3 | 215 | 490 | o | o | o~Δ | x |

(*1): The stretched film obtained at a tenter stretching speed of 12 m/min.
(*2): o: The stretching state was good.
Δ: Stretching non-uniformity occured.
x: Film breakage occured.

TABLE 2

| | Properties of Film | | | Stretchability |
|---|---|---|---|---|
| | Haze (%) | LSI (%) | Young's Modulus (kg/mm$^2$) | Tenter Stretching Stress (kg/cm$^2$) |
| Example 4 | 0.3 | 0.9 | 132 | 1.4 |
| Comparative Example 2 | 0.4 | 2.7 | 130 | 1.8 |

EXAMPLE 6

To 500 ml of dehydrated and purified n-heptane were added successively 75 millimole of diethyl aluminum chloride and 50.4 g of a titanium trichloride catalyst (a product of Marubeni-Solvay Co., Ltd.). The mixed solution was heated to 60° C. Then, 70 ml of vinyl cyclohexane was added, and polymerized for 90 minutes.

There was obtained a catalyst containing vinyl cyclohexane polymerized in an amount of 1.0 g per gram of the titanium trichloride catalyst. Using this catalyst and diethyl aluminum chloride, propylene was polymerized in the same way as in Example 1 to give polypropylene containing 0.12% by weight of vinyl cyclohexane.

The resulting copolymer (2 parts by weight) and, as stabilizers, 0.1 part by weight of calcium stearate and 0.2 part by weight of BHT and, as the antioxidant, 0.05 part by weight of Irganox ®1010 were mixed with a propylene homopolymer having a melt index of 2.0 as in Example 4. The mixture was pelletized, formed into a sheet and biaxially stretched under the same conditions as in Example 1 to give a biaxially stretched film having a thickness of about 20 microns except that the stretching temperature was 150° C.

EXAMPLES 7 AND 8

Copolymerization of propylene was carried out in the same way as in Example 6 except that vinyl cyclopentane (Example 7) or 3-methylpentene-1 (Example 8) was used instead of vinyl cyclohexane.

Using the thus obtained copolymer (vinyl cyclopentane content unit: 0.8% by weight, in Example 7; 3-methylpentene-1 content unit: 0.93% by weight, in Example 8), a biaxially stretched film having a thickness of about 20 microns was prepared under the same conditions as in Example 6 except that the amount of the copolymer added to the propylene homopolymer was changed to 0.3 PHR (Example 7) or 0.25 PHR (Example 8).

COMPARATIVE EXAMPLE 3

To 50 ml of dehydrated and purified n-heptane were added successively 1.0 millimole of triethyl aluminum and 0.89 g of a titanium trichloride catalyst (a product of Marubeni-Solvay Co., Ltd.). The mixed solution was heated to 60° C. Then, 10 ml of styrene was added, polymerized for 60 minutes.

There was obtained a catalyst containing styrene polymerized in an amount of 2.5 g per gram of the titanium trichloride catalyst. Using this catalyst and diethyl aluminum chloride, propylene was polymerized in the same way as in Example 1 to give polypropylene containing 0.75% by weight of styrene.

The resulting copolymer (0.35 part by weight) and, as stabilizers, 0.1 part by weight of calcium stearate and 0.2 part by weight of BHT and, as the antioxidant, 0.05 part by weight of Irganox ®1010 were mixed with a propylene homopolymer having a melt index of 2.0 as in Example 1. The mixture was pelletized, formed into a sheet and biaxially stretched under the same conditions as in Example 6 to give a biaxially stretched film having a thickness of about 20 microns.

COMPARATIVE EXAMPLE 4

A copolymer of 4-methylpentene-1 and propylene containing 2.4% by weight of 4-methylpentene-1 unit was obtained in the same way as in Example 6.

The resulting copolymer (0.1 part by weight) and, as stabilizers, 0.1 part by weight of calcium stearate and 0.2 part by weight of BHT and, as the antioxidant, 0.05 part by weight of Irganox ®1010 were mixed with a propylene homopolymer having a melt index of 2.0 as in Example 1. The mixture was pelletized, formed into a sheet and biaxially stretched under the same conditions as in Example 6 to give a biaxially stretched film having a thickness of about 20 microns.

COMPARATIVE EXAMPLE 5

The copolymer obtained in Example 6 was not used, and a biaxially stretched film having a thickness of about 20 microns was prepared by the same formulation and under the same processing conditions as in Example 6.

The properties of the films in Examples 6 to 8 and comparative Examples 3 to 5 are shown in Table 3.

TABLE 3

|  | Vinyl Compound | | Properties of Film | |
|---|---|---|---|---|
|  | Name | Content (wt. ppm) | Haze (%) | LST (%) |
| Example 6 | Vinyl cyclohexane | 24 | 0.4 | 1.6 |
| Example 7 | Vinyl cyclopentane | 24 | 0.3 | 1.9 |
| Example 8 | 3-Methyl-pentene-1 | 23 | 0.3 | 3.5 |
| Comparative Example 3 | Styrene | 26 | 0.6 | 12.9 |
| Comparative Example 4 | 4-Methyl-pentene-1 | 24 | 0.6 | 10.4 |
| Comparative Example 5 | none | — | 0.5 | 7.1 |

While the invention has been described in detail and with reference to specific embodiments thereof, it will be apparent to one skilled in the art that various changes and modifications can be made therein without departing from the spirit and scope thereof.

What is claimed is:

1. A stretched polypropylene film having excellent see-through characteristics, said film being prepared by stretching in at least one direction a polypropylene resin sheet containing 0.05 ppm to 10,000 ppm by weight of a 3-position branched α-olefin unit and/or a vinyl cycloalkane unit, each having at least 6 carbon atoms.

2. A film of claim 1, wherein said vinyl cycloalkane is vinyl cyclopentane, vinyl cyclohexane or vinyl norbornane.

3. A film of claim 1, wherein said α-olefin is 3,3-dimethylbutene-1, 3-methylpentene-1, 3-methylhexene-1, or 3,5,5-trimethylhexene-1.

4. A film of claim 1, wherein said polypropylene resin sheet contains 0.5 ppm to 5,000 ppm by weight of the 3-position branched α-olefin unit and/or the vinyl cycloalkane unit.

5. A film of claim 4, wherein said polypropylene resin sheet contains 0.5 ppm to 1,000 ppm by weight of the 3-position branched α-olefin unit and/or the vinyl cycloalkane unit.

* * * * *